United States Patent [19]

Thomas et al.

[11] 3,816,369

[45] June 11, 1974

[54] PROCESS FOR THE PREPARATION OF POLYAMIDES WITH ALKALI METAL DIHYDROGEN ORTHOPHOSPHATE AS CATALYST

[75] Inventors: Ieuan Thomas; James Rodney Traynor, both of Runcorn, England

[73] Assignee: Imperial Chemical Industries Limited, London, England

[22] Filed: Oct. 19, 1972

[21] Appl. No.: 299,176

[30] Foreign Application Priority Data
Nov. 8, 1971    Great Britain .................... 51717/71

[52] U.S. Cl. ............................................ 260/78 R
[51] Int. Cl. ......................................... C08g 20/20

[58] Field of Search .................... 260/78 R, 45.7 P

[56] References Cited
UNITED STATES PATENTS
2,557,808    6/1951    Walker ........................... 260/78 SC
3,671,498    6/1972    Knight ............................. 260/78 R Primary Examiner—Harold D. Anderson
Attorney, Agent, or Firm—Cushman, Darby & Cushman

[57] ABSTRACT

Production of fiber forming polyamides from aromatic diamines and dicarboxylic acids by a melt poly condensation in the presence of at least one alkali metal dihydrogen orthophosphate as catalyst.

12 Claims, No Drawings

PROCESS FOR THE PREPARATION OF POLYAMIDES WITH ALKALI METAL DIHYDROGEN ORTHOPHOSPHATE AS CATALYST

This invention relates to the production of polyamides from aromatic diamines and dicarboxylic acids by melt polycondensation process.

The production of commercially useful polyamides from aromatic diamines and dicarboxylic acids by high temperature melt polycondensation has presented special problems. Aromatic diamines react much more slowly with dicarboxylic acids than do aliphatic diamines and as a consequence the reaction mixture of aromatic diamine and dicarboxylic acid has to be maintained for a prolonged period of time in a molten state at a high temperature, this period of time being generally much greater than is necessary where the diamine is an aliphatic diamine. At high temperature thermal decomposition of the polyamide takes place, the decomposition competing with the polymerisation to such an extent as to make it difficult to produce a polyamide having a molecular weight sufficient for use in moulding applications or for use in film or fibre formation.

We have described in our British Patent Nos. 1,254,003 and 1,254,007 how hypophosphorous acid and its salts with organic bases may be used as catalysts for melt polycondensation of diaminodiphenyl sulphones and dicarboxylic acids. The aforementioned catalysts enable polycondensation to be effected successfully in the melt to produce a polyamide having an acceptable molecular weight. Although the polyamide produced using these catalysts is sufficiently stable that it can be remelted for short periods without an undesirable amount of degradation taking place the stability of the melt at temperatures above 260°C is not as great as may be desired. We have now found that by selection of the catalyst used in the polycondensation process it is possible to produce by polycondensation of a diaminodiphenyl sulphone and a dicarboxylic acid a polyamide which has a melt stability which is greater than that of the polyamide produced by the processes described in the aforementioned British Patents. Thus, at elevated temperatures of the order of 260°C or greater the effect of temperature on the molecular weight of the polyamide produced in the process of the present invention is less than the effect of temperature on the molecular weight of a polyamide produced in a process using one of the aforementioned catalysts. In particular, it is possible to produce a polyamide which has a substantial melt stability even at a temperature as high as 290°C.

The amount of degradation of the polyamide which takes place during melt polycondensation is also reflected in the colour of the polyamide produced, in general, the greater the amount of degradation the greater the colour. We have found that the colouration of the polyamide produced in the presence of selected catalysts in the process of the present invention is less than the colouration in polyamides produced by melt polycondensation in the presence of many other catalysts, and in particular, in the presence of many other inorganic phosphorous catalysts.

The invention provides a process for the preparation of a polyamide suitable for conversion into film or fibre or for use in the production of moulded articles the process comprising heating a mixture of at least one diamine, or amide-forming derivative thereof, and a substantially equimolar amount of at least one dicarboxylic acid, or amide-forming derivative thereof, at a temperature in the range 160°C to 330°C and in the presence of, as catalyst, at least one alkali metal dihydrogen orthophosphate, said diamine or amide-forming derivative thereof comprising 80 mole percent of at least one diaminodiphenyl sulphone or amide-forming derivative thereof.

The process of the invention is especially suitable for preparing polyamides from 4,4'-, 3,3'- or 3,4'-diaminodiphenyl sulphone. Mixtures of two or more diaminodiphenyl sulphones may be used if desired. It is preferred that the diaminodiphenyl sulphone forms substantially all of the diamine component, but it is possible to replace part of the said diamine with other diamines, and such a procedure sometimes has the advantage of giving a product which has improved colour, or is easier to process.

Throughout this specification it is to be understood that where we refer to the diamine and dicarboxylic acid for use in the process we include amide-forming derivatives of the diamine and dicarboxylic acid.

Preferably these other diamines, which may comprise up to 20 mole percent of the diamine in the mixture, are aliphatic diamines defined by the general formula

where $R^1$ and $R^2$, which may be the same or different, are hydrogen atoms or alkyl groups having not more than 4 carbon atoms, and $m$ is zero or an integer in the range 1 to 10.

Suitable aliphatic diamines include, for example, ethylene diamine, tetramethylene diamine, hexamethylenediamine and octamethylene diamine.

The preferred proportion of aliphatic diamine used in the reaction is in the range 5 to 10 mole percent of the total amount of diamine used.

The dicarboxylic acid used in the polycondensation is preferably a linear aliphatic acid, especially adipic acid, sebacic acid, azelaic acid, pimelic acid, suberic acid or other $\alpha,\omega$-polymethylene dicarboxylic acid, preferably having from 6 to 16 carbon atoms in all. A mixture of two or more acids may be used, if desired, and the acid or acids may be replaced by their diphenyl esters.

However, it is often advantageous to replace up to 36 mole percent of the $\alpha,\omega$-polymethylene dicarboxylic acid with one or more carbocyclic dicarboxylic acids. The effect of this is usually to increase hydrolytic stability of the polyamide produced in the process. 10 to 25 mole percent of the carbocyclic diacid is generally optimum.

Examples of suitable carbocyclic dicarboxylic acids are cyclopentane, cyclohexane, terephthalic, isophthalic and polynuclear aromatic dicarboxylic acids. Isophthalic acid is the most useful carbocyclic dicarboxylic acid. Mixtures of dicarboxylic acids may be used.

Any alkali metal dihydrogen orthophosphate may be used as a catalyst in the process, for example, lithium dihydrogen orthophophate. Sodium dihydrogen orthophosphate and potassium dihydrogen orthophosphate are the most readily available catalysts and thus the most convenient for use in the process. Potassium dihydrogen orthophosphate is preferred as it generally dissolves more readily in the melt formed from the diamine and the dicarboxylic acid. Mixtures of two or more alkali metal dihydrogen orthophosphates may be used if desired.

The diamine and dicarboxylic acid components of the mixture should be present in equimolar or substantially equimolar proportions where high molecular weight products are desired. However, a small excess of either the diamine on the dicarboxylic acid may be used without the molecular weight falling below the desired levels. It is preferred that the excess of diamine or dicarboxylic acid should not exceed 5 mole percent. The polyamide produced in the process suitably has a reduced viscosity, of at least 0.5 dlg$^{-1}$ measured on a solution of 1 g. of polymer in 100 ml. of a 5 weight-/volume percent solution of lithium chloride in dimethyl formamide at 25°C.

The catalyst may be mixed with either of the polyamide forming components of the polymerisation mixture before the two are mixed together or it may be added to the mixture. Conveniently the catalyst may be added in the form of an aqueous solution. It is especially convenient to add potassium dihydrogen phosphate in this way.

In general, only small quantities of catalyst are required. For example, an amount of alkali metal dihydrogen phosphate, or mixture thereof, in a proportion of 0.0001 to 1 part by weight for every 100 parts by weight of the mixture of diamine and dicarboxylic acid will generally suffice. Larger amounts of catalyst, e.g. up to 2 parts or even 3 parts by weight, may be used if desired. In general at least 0.1 part by weight catalyst will be used.

The process of the present invention is a melt polycondensation process. The diamine or mixture of diamines, the dicarboxylic acid or mixture of dicarboxylic acids, or amide-forming derivatives thereof, and the alkali metal dihydrogen phosphate catalyst or mixture thereof may be charged simultaneously or in any order to a suitable reaction vessel from which the air has already been, or is thereafter, removed, and the mixture may then be heated at the appropriate reaction temperature, if necessary with the application of vacuum, until the desired molecular weight in the polyamide has been achieved. The reaction is conveniently carried out under nitrogen or other inert gas. Polymer formation will usually be accompanied by an increase in the viscosity of the melt and the degree of polymerisation may be determined by measuring viscosity. As the polymerisation proceeds, it may be found desirable or even necessary to raise the temperature of the mixture in order to maintain it in molten form. The polymerisation temperature required will depend to some extent on the nature of the dicarboxylic acid component of the polymerisable mixture but in general temperatures within the range 160 to 330°C will be found suitable. Preferred temperatures generally lie in the range 220°C to 300°C.

Preferably, at least the latter part of the reaction is effected under vacuum in order to aid removal of the by-products of the polycondensation reaction. It is also preferred to effect the polycondensation by heating the mixture in two stages, in a first stage at a temperature in the range 160°C to 240°C, and in a second stage at a higher temperature in the range 220°C to 290°C. Preferably the second stage is effected under a vacuum equivalent to an absolute pressure of 1.0mm of mercury absolute or less.

The heating should be effected until a polyamide having the desired molecular weight is produced. The time for which heating should be effected will depend on the temperature at which the process is effected. Heating for a period of 10 mins. to 12 hours is generally sufficient.

The polyamide may be recovered from the reaction vessel by means known in the art of polycondensation chemistry, for example, by extrusion. If desired, the acid content of the polyamide product may be reduced by using an excess of the diamine component and/or by including a monofunctional primary or secondary amine in the reaction mixture. Preferred amines for this purpose are monoaminodiphenyl sulphones and aliphatic amines. Simple aromatic amines may discolour at high temperatures and for this reason should be avoided. The acid residues in the polyamide may be further reduced after processing by reacting the polyamide with a compound which reacts with free carboxyl groups to give a stable group. Isocyanates and epoxides are suitable for this purpose.

Free amine end-groups on the polyamide may be neutralised by acylation, e.g. with acetyl chloride. The process of the present invention may be carried out in the presence of a delustrant such as titanium dioxide.

Where $\alpha,\omega$-polymethylene dicarboxylic acids having from six to 16 carbon atoms in all are polycondensed with the diaminodiphenyl sulphones, the polyamide products of the invention are generally mouldable amorphous materials which may be injection-, compression-, or transfer-moulded, or extruded into shaped articles, e.g. fibres, films and thick-walled articles. The products are generally convertible to films, fibres and coatings from solution in suitable solvents.

Before shaping, the polymer may be mixed, if desired, with any of the usual polymer additives, e.g. heat and light stabilisers, lubricants, fillers, delustrants, mould-release agents and plasticisers, and may be blended with other polymeric materials, natural or synthetic.

The invention is illustrated by the following Examples in which all parts are expressed as parts by weight.

The diaminodiphenyl sulphone used in the Examples was "Dapsone B.P." (Imperial Chemical Industries Limited), and the azelaic acid used was "Emerox 1144" (Emery Chemical Company).

EXAMPLE 1

To demonstrate the effect of alkali metal dihydrogen orthophosphates on the molecular weight of the polyamide produced by melt polycondensation compared with the effect of other phosphorus acid salts the following polymerisations were carried out using a number of phosphorous acid salts as catalysts. In separate experiments 24.8 parts (1 molar part) of dry 4,4'-diaminodiphenyl sulphone, 19.0 parts (1 molar part) of azelaic acid and the appropriate amounts of a number of catalysts (see Table I) were mixed together in polymerisation tubes under an atmosphere of nitrogen and the mixtures were heated in a fluidised sand bath at 200°C. After melting the reactants were agitated by passing a rapid current of nitrogen through the mixtures.

Heating was continued at this temperature for 30 minutes. The temperature was then raised to 260°C and after 30 minutes vacuum was gradually applied. A final vacuum of approximately 1 mm of Hg absolute pressure was achieved. The reaction was continued under these conditions for 5 hours to give the products listed in Table I.

Only the alkali metal dihydrogen phosphates gave a polyamide product with a reduced viscosity (measured as hereinbefore described) greater than 0.5 dlg$^{-1}$ and these products were lighter in colour than the polyamides produced using other catalysts.

TABLE I

Inorganic salts as catalysts
Product

| Catalyst | Weight (mgs.) | Colour | Reduced Viscosity dlg$^{-1}$ |
|---|---|---|---|
| NaH$_2$PO$_4$ | 150 | v. pale | 0.53 |
| Na$_2$HPO$_4$ | 135 | yellow | 0.26 |
| Na$_2$H$_2$P$_2$O$_7$ | 105 | pale yellow | 0.31 |
| NaH$_2$PO$_2$ | 92 | brown | 0.29 |
| (NH$_3$)$_4$PO$_4$ | 150 | brown | cross-linked |
| KH$_2$PO$_4$ | 100 | v. pale | 0.63 |

EXAMPLE 2

496 parts of dry 4,4'-diaminodiphenyl sulphone, 380 parts of azelaic acid, and 3 parts of sodium dihydrogen orthophosphate (B.D.H reagent grade) were mixed in a two litre flange-necked flask under an atmosphere of nitrogen. The flask was heated on an electrical heating mantle and stirring started as soon as possible. After approximately 1 hour at 190°C the resulting pale-coloured melt was charged into a 3 litre stainless steel autoclave which has been purged with nitrogen and heated to 200°C. The melt was stirred at 260°C for 1 hour, then the pressure was gradually reduced to 0.05mm of Hg absolute. The melt was stirred under these conditions for 3½ hours and the polymer formed was extruded from the autoclave under a nitrogen pressure of 50 lbs/in$^2$. The polymer had a very pale colour, which was lighter than that of polymer prepared with hypophosphorous acid as catalyst. The extrudate was granulated (polymer A) and was found to have a reduced viscosity measured as hereinbefore described of 0.82 dlg$^{-1}$ at 25°C. The acid content was determined by potentiometric titration in N,N-dimethylacetamide and was found to be 79μ equivalents per gram.

A polymer was prepared under essentially the same conditions as above but using 2.5 parts of 50 percent aqueous hypophosphorous acid (B.D.H. reagent grade) as catalyst in place of the sodium dihydrogen orthophosphate. The polymer (Polymer B) obtained was yellow in colour and had a reduced viscosity of 0.89 dlg$^{-1}$ and an acid content of 177μ equivalents per gram, measured as above.

Samples of Polymer A and B were dried at 170°C for a 2 days under a vacuum of 1 mm Hg absolute. Portions of the dried samples were compression moulded at 270°C to give film 0.01 ins. thick which were cut into strips and immersed in boiling water. Strips were removed at various times and the reduced viscosity measured. Portions of the dried samples were placed in a capillary melt viscometer and their melt stabilities determined. Results are given in Tables II–IV.

TABLE II

| Time in boiling water (hrs.) | Reduced Viscosities of Film dlg$^{-1}$ | |
|---|---|---|
| | Polymer A | Polymer B |
| 0 | 0.79 | 0.81 |
| 15 | 0.72 | |
| 20 | | 0.56 |
| 86 | 0.56 | |
| 165 | 0.51 | |
| 170 | | 0.29 |
| 330 | 0.30 | |

TABLE III

Melt Stability at 270°C and 264 sec$^{-1}$

| Time | Melt Viscosity (Poise) | | Reduced Viscosity of Extrudate dlg$^{-1}$ | |
|---|---|---|---|---|
| | Polymer A | Polymer B | Polymer A | Polymer B |
| 6 | 11,200 | 10,800 | 0.76 | 0.73 |
| 11 | 11,200 | | | |
| 12 | | 8,570 | | |
| 16 | 10,950 | | | |
| 17 | | 8,420 | | |
| 22 | 11,050 | 7,470 | | |
| 26 | 10,250 | | | |
| 28 | | 6,560 | | 0.43 |
| 32 | 9,950 | | 0.71 | |

TABLE IV

Melt Stability at 300°C

| Time | Melt Viscosity (Poise) | | Reduced Viscosity of Extrudate dlg$^{-1}$ | |
|---|---|---|---|---|
| | Polymer A | Polymer B | Polymer A | Polymer B |
| 6 | 2,450 | | 0.77 | |
| 6½ | | 1,620 | | 0.51 |
| 10 | 2,500 | | | |
| 12½ | | 657 | | |
| 14½ | 2,420 | | | |
| 17½ | | 486 | | |
| 21 | 2,240 | | 0.70 | |
| 22½ | | 417 | | 0.38 |

EXAMPLE 3

496 parts of dry 4,4'-diaminodiphenyl sulphone, 380 parts of azelaic acid and a solution of 4 parts of sodium dihydrogen orthophosphate in 20 parts of water were mixed in a two litre flange-necked flask under an atmosphere of nitrogen. The flask was heated on an electrical heating mantle and stirring started as soon as possible. After 1½ hours at 240°C the resulting pale coloured melt was charged into a stainless steel autoclave which had been purged with nitrogen and heated to 250°C. The melt was stirred at 250°C for 1 hour and then the pressure was gradually reduced to 0.4 mm Hg absolute pressure. The temperature was raised to 290°C and stirring maintained under these conditions for 20 minutes, the polymer formed was extruded from the autoclave under nitrogen pressure. The extrudate was a very pale colour much lighter than that of Polymer B is Example 2. It was found to have a reduced viscosity measured as hereinbefore described of 0.78 dl.g$^{-1}$

EXAMPLE 4

502 parts (2 molar parts) of undried 4,4'-diaminodiphenyl sulphone, 380 parts (2 molar parts) of azelaic acid and 4 parts of sodium dihydrogen orthophosphate were mixed in a two-litre flange necked flash under an atmosphere of nitrogen. The flask was heated and stirring was started as soon as possible. After three-fourths hour at 190°C 15 ml of a 15 w/w percent aqueous suspension of titanium dioxide (Titanox AD) was added. After an hour at 190°C the melt was charged to a 3 litre autoclave and the procedure of the previous example repeated. An opaque pale cream extrudate was obtained and was found to have a reduced viscosity of 0.76 dl.g$^{-1}$ measured as hereinbefore described.

EXAMPLE 5

505 parts (2 molar parts) of 4,4'-diaminodiphenyl sulphone (2 percent water content), 304 parts(1.6 molar parts) of azelaic acid 66.4 parts (0.4 molar parts) of isophthalic acid (B.D.H. Laboratory Grade), and a solution of 2 parts of sodium dihydrogen phosphate in 10 parts of water were mixed in a 2 litre flange neck flask under an atmosphere of nitrogen. The flask was heated in an oil bath and stirring started as soon as possible. After approximately 2 hours at 240°C the resulting pale coloured melt was charged into a 3 litre stainless steel autoclave which had been purged with nitrogen and heated to 260°C. The melt was stirred at 260°C. for 1 hour then the pressure was gradually reduced to 0.05 mm of Hg. The temperature was then raised to 290°C. The melt was stirred under these conditions for 5 hours and the polymer formed was extruded from the autoclave under a nitrogen pressure of 30 lb per sq. in. The polymer had a yellow colour which was lighter than that of the co-polyamide prepared using hypophosphorous acid. The polymer had a reduced viscosity, measured as hereinbefore described of 0.66 dl.g$^{-1}$.

What we claim is:

1. A process for the preparation of a film- or fibre-forming or mouldable polyamide which comprises heating a mixture of at least one diamine, or amide-forming derivative thereof, and a substantially equimolar amount of at least one dicarboxylic acid or amide-forming derivative thereof, at a temperature in the range 160°C to 330°C in the presence of, as catalyst, at least one alkali metal dihydrogen orthophosphate, said diamine or amide-forming derivative thereof comprising at least 80 mole percent of at least one diaminodiphenyl sulphone or amide-forming derivative thereof.

2. A process as claimed in claim 1 in which the diaminodiphenyl sulphone or amide-forming derivative thereof forms substantially all of the diamine component in the mixture.

3. A process as claimed in claim 1 in which the diamine or amide-forming derivative thereof comprises up to 20 mole percent of at least one aliphatic diamine having the structure $$H_2N\ CH_2\ (CR^1R^2)_m\ CH_2NH_2$$

<div style="text-align:right">I</div> or amide forming derivative thereof, where $R_1$ and $R_2$, which may be the same or different, are hydrogen atoms or alkyl groups having not more than four carbon atoms, and $m$ is 0 or an integer in the range 1 to 10.

4. A process as claimed in claim 1 in which the diaminodiphenyl sulphone is 4,4'-diaminodiphenyl sulphone.

5. A process as claimed in claim 3 in which the diamine or amide-forming derivative thereof comprises from 5 to 10 mole percent of at least one aliphatic diamine having the structure I, or amide-forming derivative thereof.

6. A process as claimed in any claim 1 in which the dicarboxylic acid, or amide-forming derivative thereof, is at least one α,ω-polymethylene dicarboxylic acid having from six to 16 carbon atoms, or amide-forming derivative thereof.

7. A process as claimed in claim 6 in which up to 36 mole percent of the α,ω-polymethylene dicarboxylic acid, or amide-forming derivative thereof, is replaced by at least one carbocyclic dicarboxylic acid or amide-forming derivative thereof.

8. A process as claimed in claim 6 in which the α,ω-dicarboxylic acid or amide-forming derivative thereof is azeleic acid or amide-forming derivative thereof.

9. A process as claimed in claim 1 in which the alkali metal dihydrogen orthophosphate is sodium dihydrogen orthophosphate or potassium dihydrogen orthophosphate, or a mixture thereof.

10. A process as claimed in claim 1 in which the alkali metal dihydrogen orthophosphate, or mixture thereof, is present in a proportion of 0.0001 to 1 part by weight for every 100 parts by weight of the mixture of diamine and dicarboxylic acid or amide-forming derivatives thereof.

11. A process as claimed in claim 1 in which the mixture is heated at a temperature in the range 220° to 300°C.

12. A process as claimed in claim 1 in which the heating of the mixture is effected in two stages, in a first stage at a temperature in the range 160°C to 240°C, and in a second stage at a higher temperature in the range 220°C to 290°C and under a vacuum equivalent to an absolute pressure of 1.0 mm of mercury absolute or less.

* * * * *